United States Patent
To et al.

(10) Patent No.: US 6,507,218 B1
(45) Date of Patent: Jan. 14, 2003

(54) METHOD AND APPARATUS FOR REDUCING BACK-TO-BACK VOLTAGE GLITCH ON HIGH SPEED DATA BUS

(75) Inventors: Hing Y. To, Folsom; Jen-Tai Hsu, El Dorado Hills, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,822

(22) Filed: Mar. 31, 2000

(51) Int. Cl.$^7$ ............................................. H03K 19/0175
(52) U.S. Cl. .............................. 326/81; 326/68; 326/86
(58) Field of Search .............................. 326/86, 83, 81, 326/68

(56) References Cited

U.S. PATENT DOCUMENTS

| | | |
|---|---|---|
| 5,128,560 A | 7/1992 | Chern et al. |
| 5,179,299 A * | 1/1993 | Tipon ........................ 307/443 |
| 5,235,222 A * | 8/1993 | Kondoh et al. ............. 307/475 |
| 5,781,034 A * | 7/1998 | Rees et al. .................... 326/86 |
| 5,969,554 A | 10/1999 | Chan et al. |
| 6,031,395 A * | 2/2000 | Choi et al. .................... 326/83 |
| 6,040,737 A | 3/2000 | Ranjan et al. |
| 6,184,700 B1 * | 2/2001 | Morris ......................... 326/14 |

OTHER PUBLICATIONS

Copy of Search Report for PCT/US01/08067, mailed Sep. 10, 2001, 2 pages.

* cited by examiner

*Primary Examiner*—Michael Tokar
*Assistant Examiner*—Anh Q. Tran
(74) *Attorney, Agent, or Firm*—Calvin E. Wells

(57) ABSTRACT

An example embodiment of a method and apparatus for reducing back-to-back voltage glitch on a high speed bus is described. A pre-driver circuit receives an input voltage signal whose voltage level swings from a logically low voltage level to a logically high voltage level where the logically low voltage level approximately equals VSS and the logically high voltage level approximately equals VCC. The pre-driver circuit reduces the magnitude of the voltage swing to create a signal that when delivered to a driver transistor ensures that the driver transistor will operate in its saturation region even when the voltage on the high speed bus is at its minimum specified voltage. When the driver transistor operates in its saturation region it can sink a constant current and provide a high output impedance.

18 Claims, 5 Drawing Sheets

Figure 1 – Prior Art

METHOD AND APPARATUS FOR REDUCING BACK-TO-BACK VOLTAGE GLITCH ON HIGH SPEED DATA BUS

FIELD OF THE INVENTION

The present invention pertains to the field of computer systems. More particularly, this invention pertains to the field of improving signal integrity on a high speed data bus.

BACKGROUND OF THE INVENTION

The response of a high-speed data bus, such as one of today's high bandwidth memory busses, depends strongly on the characteristics of the output drivers coupled to the bus. Among the various characteristics that affect signal integrity on the data bus is the voltage at which the output driver becomes a non-linear current source. This non-linearity can negatively impact signal integrity and can result in data corruption.

FIG. 1 shows a prior data bus coupled to a bus controller 170. The bus controller 170 may be connected to a microprocessor or other computer system agent (not shown). The data bus is represented by transmission line segments 120, 130, and 140. The bus is terminated by a terminating resistor 110 which is tied to a terminating voltage Vterm. Coupled to the bus are two driver transistors 150 and 160. The driver transistor 150 may receive an input signal at its gate terminal 151 and the driver transistor 160 may receive another input signal at its gate terminal 161. The input signals may be received from a memory device or other data source. The driver transistors 150 and 160 serve to transmit data out onto the data bus.

The driver transistors 150 and 160 conduct current when a logically high voltage is applied to the gate terminals of the driver transistors. The bus controller 170 detects the current drain through the driver transistors 150 and 160 and in this manner the driver transistors 150 and 160 are able to communicate with the bus controller 170. The bus controller 170 has a minimum current specification that must be met before the bus controller 170 can detect data transmission from the driver transistors 150 and 160. A typical current specification may be 28 mA. Therefore, for this example, the driver transistors 150 and 160 must be able to sink 28 mA of current in order to ensure proper data transfer.

A problem may occur when driver transistors 150 and 160 try to perform a back-to-back transfer. For this example, Vterm equals 1.8V and the logically high voltage applied to the gate terminal of the driver transistors 150 and 160 is also 1.8V. When 1.8 volts is present on the bus (due to the connection to Vterm through the terminating resistor 110) and a logically high voltage is applied to the gate terminals of the driver transistors 150 and 160, the driver transistors 150 and 160 operate in their saturation regions and the driver transistors 150 and 160 are therefore able to sink a constant current (28 mA is this example). If, however, the voltage on the bus falls below the driver saturation voltage, then the driver transistors 150 and 160 would not be operating in their saturation regions and would therefore not be able to sink a constant current of 28 mA. This can present problems during back-to-back transfers.

For example, a logically high voltage is applied to the gate terminal 151 of the driver transistor 150 during a clock period and the driver transistor 150 sinks 28 mA during that clock period. Towards the end of the clock period, the logically high voltage is removed from the gate terminal of the driver transistor 150 and the driver transistor 150 ceases to sink current. In the next clock period, another logically high voltage is applied to the gate terminal 161 of driver transistor 160. However, instead of 1.8V being present on the bus at the beginning of the clock period, the data transfer during the previous clock period may have caused the voltage on the bus to drop to perhaps 1.0V. With a logically high voltage of 1.8V applied to the gate terminal 161 and with the bus sitting at 1.0V, the driver transistor 160 is not able to operate in its saturation region and is not able to sink a constant 28 mA. Data corruption is a possible result.

Prior data bus systems have dealt with this problem by inserting a wait cycle between data transfers. For example, with the data transfer described above an extra clock period can be inserted between the data transfer of driver 150 and the data transfer of driver 160, thus allowing the voltage on the data bus time to return to 1.8V which would allow the driver transistor 160 to operate in its saturation region. The insertion of a wait cycle, however, has the drawback of reducing data throughput and negatively impacting system performance.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An example embodiment of a method and apparatus for reducing back-to-back voltage glitch on a high speed bus will be described. For this example, a pre-driver circuit receives an input voltage signal whose voltage level swings from a logically low voltage level to a logically high voltage level where the logically low voltage level approximately equals VSS and the logically high voltage level approximately equals VCC. The pre-driver reduces the magnitude of the voltage swing to create a signal that when delivered to a driver transistor ensures that the driver transistor will operate in its saturation region even when the voltage on the high speed bus is at its minimum specified voltage. When the driver transistor operates in its saturation region it can sink a constant current and also provide a high output impedance.

Figure 1:
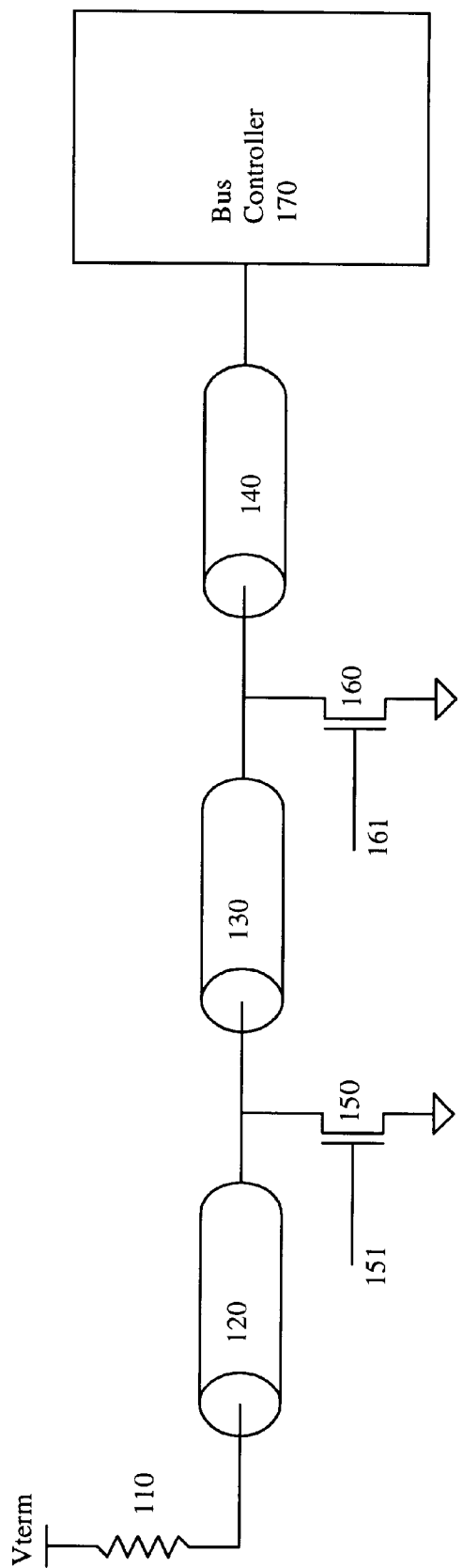
FIG. 1 is a block diagram of a prior system for transferring data over a high speed bus.
Figure 2:
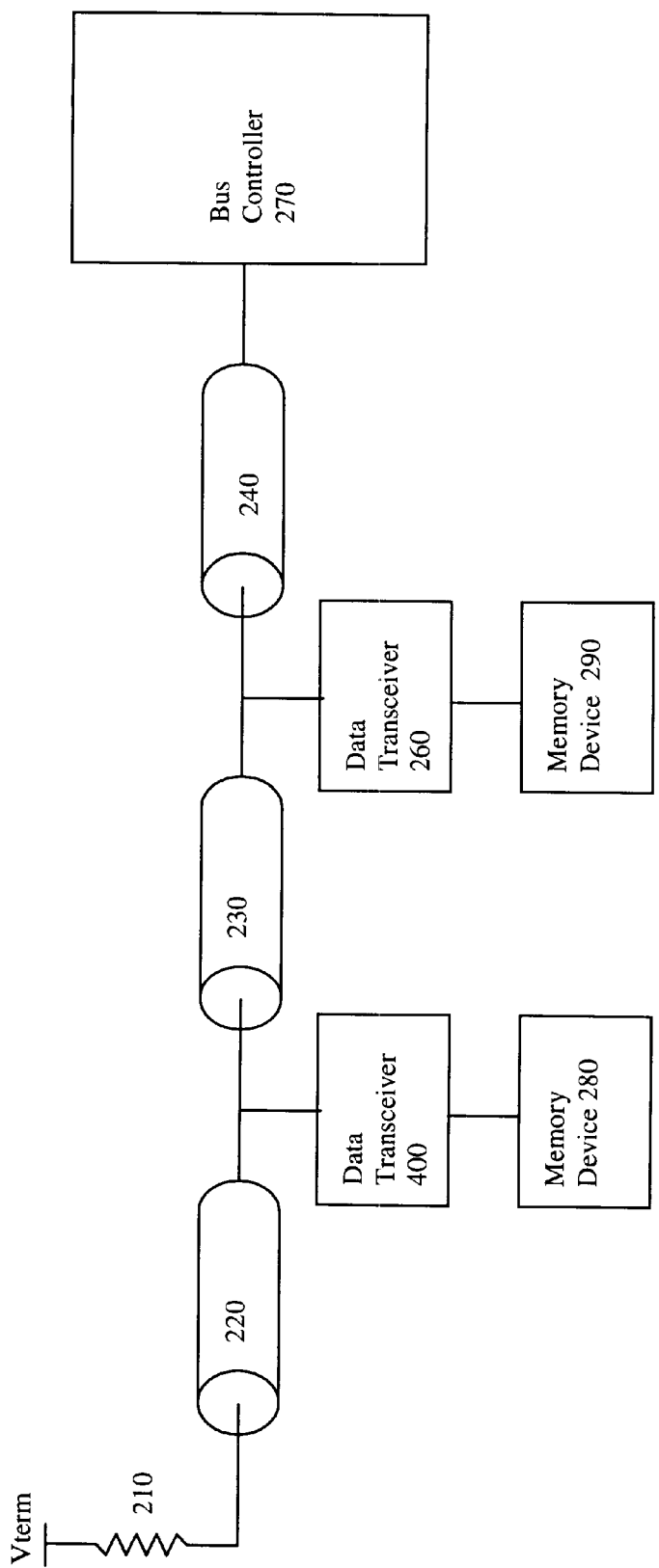
FIG. 2 is a block diagram of a system implemented in accordance with an embodiment of the invention.

FIG. 2 is a block diagram of a high speed bus system implemented in accordance with an embodiment of the invention. The system of FIG. 2 includes a bus controller 270. The bus controller 270 may be coupled to a microprocessor or other computer system agent (not shown). The bus controller 270 receives data from a data transceiver 400 and a data transceiver 260. The data transceivers 400 and 260 are coupled to memory devices 280 and 290 respectively. The memory devices 280 and 290 deliver data to the data transceivers 400 and 260. The data transceivers 400 and 260 transmit the data received from the memory devices 280 and 290 to the bus controller 270. The data transceivers 400 and 260 communicate with the bus controller 270 via a data bus represented by transmission line segments 220, 230, and 240. The data bus also includes a termination resistor 210 that is connected to a termination voltage Vterm. Vterm for this example embodiment is 1.8V.

Other embodiments are possible using other values for VCC and Vterm. The termination resistor 210 has a value of 28 Ohms, which matches the characteristic impedance of the transmission line segments 220, 230, and 240. Other embodiments are possible using different values for the termination resistor 210 and the characteristic impedance of the transmission line segments 220, 230, and 240. The data bus system of FIG. 2 may operate at a clock speed of 400 MHz, although other embodiments are possible using other clock speeds. Further, although the system of FIG. 2 includes memory devices, other embodiments are possible using other computer system agents to deliver data to the bus controller 270 through the data transceivers 400 and 260. Also, although in this example embodiment two data transceivers are discussed, other embodiments are possible using other numbers of data transceivers.

In order to make the most efficient use of the potential available bandwidth, the data transceivers 400 and 260 may perform back-to-back data transfers where one of the data transceivers can deliver data in one clock period and the other data transceiver can deliver data in the next clock period without a wait cycle inserted between the data transfers. To help ensure signal integrity and proper data transfer, the data transceivers sink a constant current when conducting and when the voltage level on the bus is within a range defined by Vterm and a minimum low voltage specification. In this example embodiment, the minimum low voltage specification is 1.0V, although other embodiments are possible using other minimum low voltage specifications.

Figure 3:
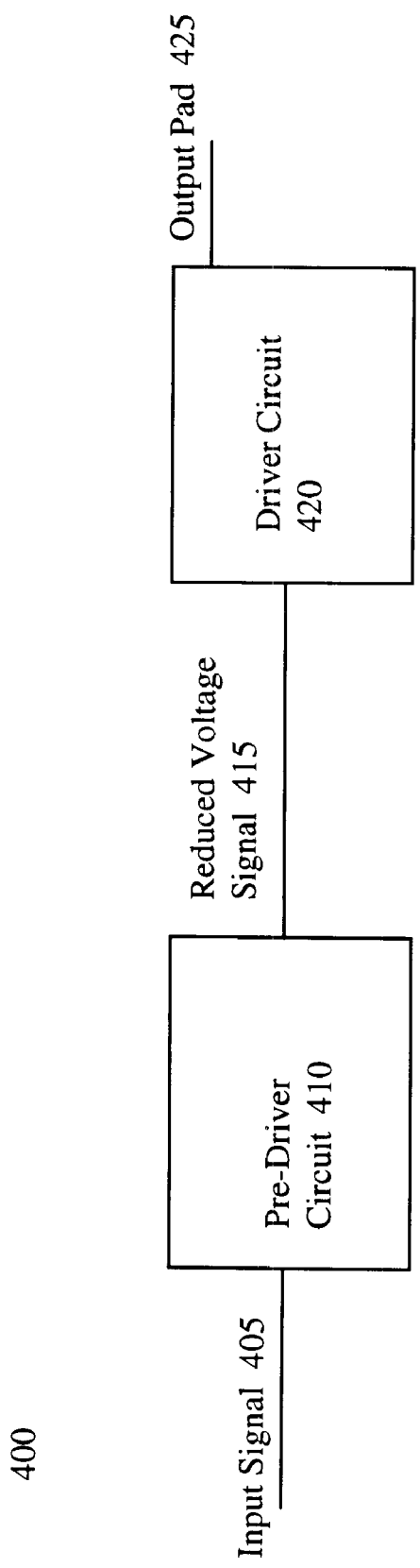
FIG. 3 is a block diagram of a data transceiver implemented in accordance with an embodiment of the invention.

FIG. 3 is a block diagram of the data transceiver 400. The data transceiver 260 of FIG. 2 may be implemented in like fashion but will not be mentioned in connection with FIG. 3 nor in connection with FIG. 4 in order to simplify the discussion.

The data transceiver 400 includes a pre-driver circuit 410 and a driver circuit 420. The pre-driver circuit receives an input signal 405. The input signal 405 may be delivered from a memory device such the memory device 280 of FIG. 2. The input signal 405 in this example embodiment has a voltage swing of from VCC to VSS.

The pre-driver circuit 410 takes the input signal 405 and reduces the voltage swing to produce a reduced voltage signal 415 that is delivered to the driver circuit 420. The reduced voltage signal 415 has a voltage swing that ensures that the driver circuit 420 can sink a constant current when conducting. The driver circuit 420 draws current from an output pad 425 that provides a connection to the data bus of FIG. 2.

One embodiment of the pre-driver circuit may include a simple voltage divider circuit, although a simple voltage divider circuit would have the drawback of continuously drawing current.

Figure 4:
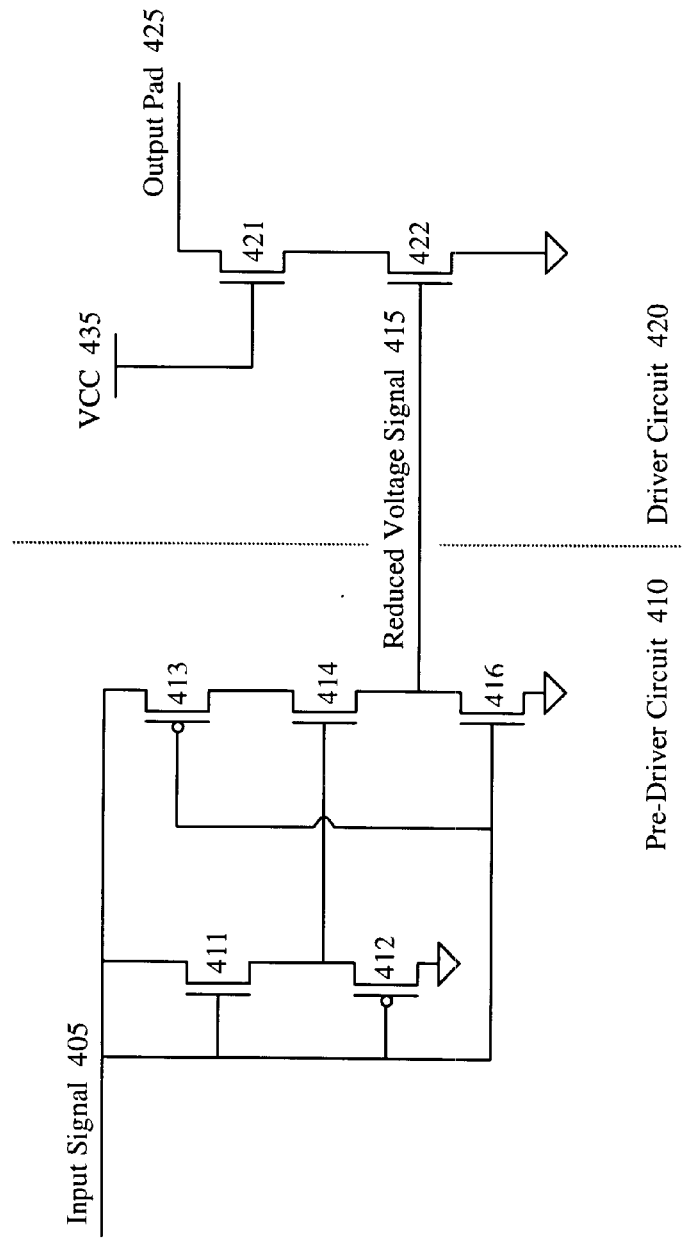
FIG. 4 is a circuit diagram of a data transceiver implemented in accordance with an embodiment of the invention.

FIG. 4 is a circuit diagram of one embodiment of the data transceiver 400. This example embodiment does not continuously draw significant amounts of current as would be the case with a simple voltage divider circuit. The pre-driver circuit 410 includes NMOS transistors 411, 414, and 416 as well as PMOS transistors 412 and 413. The driver circuit 420 includes NMOS transistors 421 and 422.

When the input signal 405 swings to VCC (1.8V in this example), the transistor 411 conducts and a voltage of VCC minus one threshold voltage for transistor 411 is applied to the gate terminal of transistor 414. Transistor 416 also conducts and a voltage level of VSS is delivered to the reduced voltage signal 415. When VSS is applied to the transistor 422, the transistor 422 does not conduct and no current is drawn from the output pad 425 which is connected to the data bus.

When the input signal 405 swings to VSS, the NMOS transistors 411 and 416 cease to conduct and instead the PMOS transistors 412 and 413 conduct. When the transistor 412 conducts, a voltage level of VSS plus one threshold voltage for transistor 412 is applied to the gate of transistor 414 and a voltage level of one threshold voltage for transistor 412 minus one threshold voltage for transistor 414 is applied to the reduced voltage signal 415. The transistors 412 and 414 can be designed to produce an appropriate voltage for the reduced voltage signal 415 when the input signal is at VSS. An appropriate voltage applied to the reduced voltage signal 415 would be a voltage that would allow the transistor 422 to operate in its saturation region and thereby sink a constant current when conducting. If the minimum voltage seen by the output pad 425 is 1.0V and if the threshold voltage for transistor 422 is 0.4V, then the transistor 422 will operate in its saturation region when the voltage applied to the reduced voltage signal 415 does not exceed 1.4V.

The transistor 421 provides capacitive decoupling between the output pad 425 and the driver transistor 422. Thus, any high frequency oscillations observed on the output pad 425 will not negatively impact the operation of the driver transistor 422.

Although specific voltage levels are mentioned in the above discussion, other embodiments are possible using other voltage levels.

Figure 5:
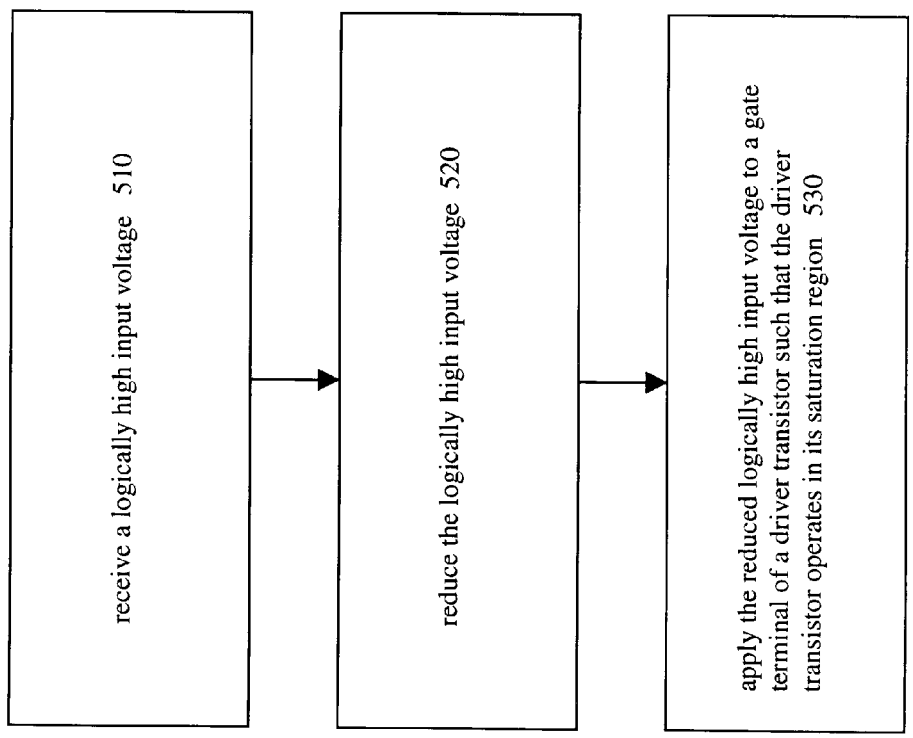
FIG. 5 is a flow diagram of a method for reducing back-to-back voltage glitch on a high speed data bus implemented in accordance with an embodiment of the invention.

FIG. 5 is a flow diagram of a method for reducing back-to-back voltage glitch on a high speed data bus implemented in accordance with an embodiment of the invention. At block 510, a logically high input voltage is received. The logically high input voltage is reduced at block 520. At block 530, the reduced logically high input voltage is applied to a gate terminal of a driver transistor such that the driver transistor operates in its saturation region.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a driver circuit including a driver transistor, the driver transistor including a gate terminal, the driver circuit further comprising a decoupling transistor coupled between the driver transistor and an output pad, the decoupling transistor including a gate terminal, the gate terminal of the decoupling transistor coupled to a positive supply voltage; and a pre-driver circuit to accept a logically high input voltage and to deliver a reduced logically high voltage to the gate terminal of the driver transistor, the reduced logically high voltage no greater than one driver transistor threshold voltage plus a minimum voltage seen at an output pad.

2. The apparatus of claim 1, wherein the minimum voltage seen at the output pad is approximately 1V.

3. The apparatus of claim 2, wherein the reduced logically high voltage delivered to the gate terminal of the driver transistor is no greater than 1.4V.

4. The apparatus of claim 2, wherein the driver transistor and the decoupling transistor are coupled in a cascode arrangement.

5. The apparatus of claim 4, wherein the positive voltage supply voltage is approximately 1.8V.

6. A system, comprising:

a data bus controller; and a data transceiver coupled to the bus controller via a data bus, the data transceiver including a driver circuit including a driver transistor, the driver transistor including a gate terminal, and a pre-driver circuit to accept a logically high input voltage and to deliver a reduced logically high voltage to the gate terminal of the driver transistor.

7. The system of claim 6, the pre-driver circuit to deliver the reduced logically high voltage to the gate terminal of the driver transistor such that the driver transistor operates in its saturation region when the reduced logically high voltage is applied to the gate terminal of the driver transistor.

8. The system of claim 7, the driver circuit further comprising a decoupling transistor coupled between the driver transistor and an output pad, the output pad coupled to the data bus, the decoupling transistor including a gate terminal, the gate terminal of the decoupling transistor coupled to a positive supply voltage.

9. The system of claim 8, wherein the reduced logically high voltage delivered to the gate terminal of the driver transistor is no greater than one driver transistor threshold voltage plus a minimum voltage seen at the output pad.

10. The system of claim 9, wherein the minimum voltage seen at the output pad is approximately 1.0V.

11. The system of claim 10, wherein the reduced logically high voltage delivered to the gate terminal of the driver transistor is no greater than 1.4V.

12. The system of claim 11, wherein the driver transistor and the decoupling transistor are coupled in a cascode arrangement.

13. The apparatus of claim 12, wherein the positive voltage supply voltage is approximately 1.8V.

14. A system, comprising:

means for controlling a data bus; and means for transmitting data from a data storage device to the data bus, the means for transmitting data including means for sinking current from an output pad, and means for accepting a logically high input voltage and delivering a reduced logically high voltage to an input of the driver means.

15. The system of claim 14, the means for accepting a logically high input voltage and delivering a reduced logically high voltage to deliver the reduced logically high voltage to the means for sinking current such that the means for sinking current is capable of sinking a constant current.

16. The system of claim 14, further comprising means for providing high frequency decoupling between the output pad and the input of the driver means.

17. A method, comprising:

receiving a logically high input voltage;

reducing the logically high input voltage such that the reduced logically high input voltage is no greater than the threshold voltage for the driver transistor plus a minimum voltage seen at the output pad; and applying the reduced logically high input voltage to a gate terminal of a driver transistor such that the driver transistor operates in its saturation region.

18. The method of claim 17, wherein reducing the logically high input voltage includes reducing the logically high input voltage such that the reduced logically high input voltage is no greater than the threshold voltage for the driver transistor plus approximately 1.0V.

* * * * *